Jan. 8, 1929.  V. KARBOWSKI  1,698,195
HOSE COUPLING
Filed Aug. 2, 1926
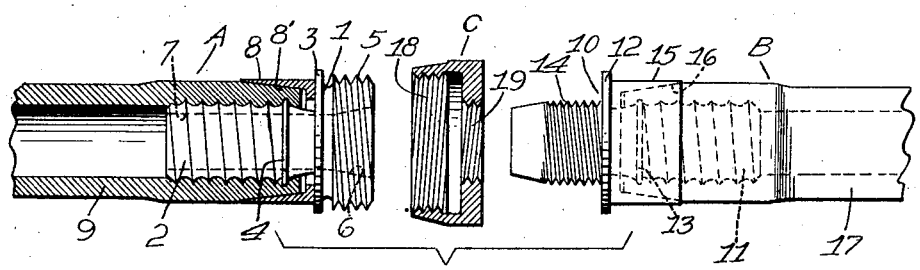
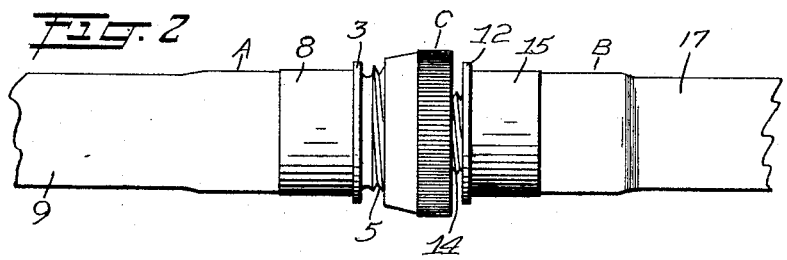
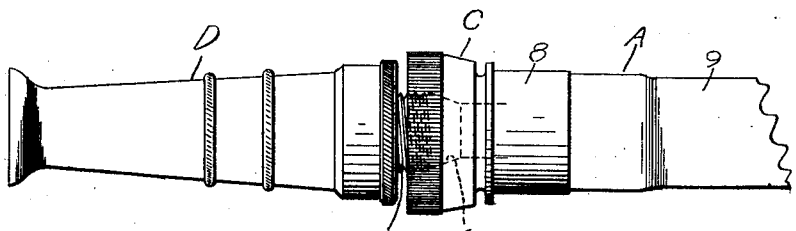
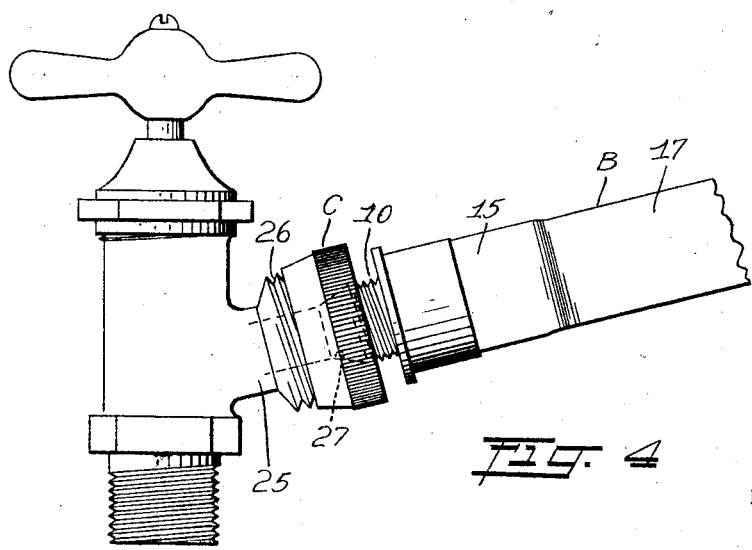
INVENTOR
V. KARBOWSKI
BY *Munn & Co.*
ATTORNEYS Patented Jan. 8, 1929.

1,698,195

UNITED STATES PATENT OFFICE.

VICTOR KARBOWSKI, OF CHICAGO, ILLINOIS, ASSIGNOR OF ONE-HALF TO FELIX S. FELDHEIM, OF EVANSTON, ILLINOIS.

HOSE COUPLING.

Application filed August 2, 1926. Serial No. 126,675.

My invention relates to improvements in hose couplings, and it consists in the combinations, constructions, and arrangements herein described and claimed.

An object of my invention is to provide a hose coupling with which two sections of hose may be readily and firmly secured together to form a liquid or air-tight joint.

A further object of my invention is to provide a device of the type described in which one of the sections of hose may be readily and firmly secured to a nozzle.

A further object of my invention is to provide a device of the type described in which the other section may be readily and firmly secured to a faucet.

A further object of my invention is to provide a device of the type described which is especially adapted to fire or garden hose, but which may be used for other liquids, gases, or air.

A further object of my invention is to provide a device of the type described which has novel means for securing the sections of hose to the connections to provide leak-proof joints.

Other objects and advantages will appear in the following specification, and the novel features of the invention will be particularly pointed out in the appended claim.

My invention is illustrated in the accompanying drawings, forming part of this application, in which Figure 1 is a view of each section of the hose coupling and the nut for connecting them, Figure 2 is a view of the hose coupling shown in elevation with the parts assembled.

Figure 3 is a view of one of the sections secured to a nozzle, and

Figure 4 is a view of the other section secured to a faucet.

In carrying out my invention, I provide sections A and B which are secured together by a nut C. The section A consists of a female member 1 having a threaded hose connection 2 and an abutting flange 3. The threads upon the hose connection 2 are relatively large half-round threads. The threads terminate adjacent an annular locking flange 4 which is spaced a short distance from the abutting flange 3. The end opposite the hose connection 2 is provided with an enlarged portion 5 having relatively coarse threads thereon. The enlarged portion 5 is provided with a tapered opening 6 which communicates with an opening 7, the latter extending through the hose connection 2.

An annular collar 8 having a tapered inner wall 8' is disposed concentric with the hose connection 2 and adjacent the abutting flange 3. A hose 9 is provided. The hose connection 2 is rotated so as to cause the connection to move inwardly within the hose. As the hose passes within the collar 8, the end of the hose is forced inwardly around the locking flange 4, thus providing a leak-proof joint.

The section B is provided with a male member 10 having a hose connection 11 and an abutting flange 12. The hose connection 11 is identical in construction to the hose connection 2, and is provided with an annular locking flange 13 which is spaced away from the abutting flange 12. A relatively small portion 14 is provided with relatively fine threads. An annular collar 15 having a tapered inner wall 16 is disposed concentric with the hose connection 11 and adjacent the abutting flange 12. A hose 17 is provided. The hose connection 11 is rotated so as to be moved inwardly within the hose 17. As the end of the hose 17 passes within the collar 15, the tapered wall 16 forces the end of the hose inwardly around the locking flange 13.

The nut C is provided with relatively coarse threads 18 which are adapted to receive the threads upon the portion 5 of the female member. The nut is further provided with relatively fine threads 19 which are adapted to receive the threads upon the relatively small portion 14 of the male member.

In Figure 3, I have shown the section A, the nut C, and a nozzle D. The nozzle D is provided with a male member 20 having a relatively small threaded portion, the threads thereon being adapted to receive the threads 19 of the nut C. The male member 20 is adapted to be received in the tapered opening 6 of the female member 1.

In Figure 4, I have shown a faucet having a female member 25 and an enlarged portion 26 which is provided with relatively coarse threads. The threads on the enlarged portion 26 are adapted to receive the threads 18 of the nut C. The female member 25 is provided with a tapered opening 27 which is adapted to receive the male member 10.

From the foregoing description of the various parts of the device, the operation thereof may be readily understood. In securing the sections A and B together, the nut C is disposed upon the relatively small portion 14 adjacent the abutting flange 12. The female member 1 is then disposed in a position so as to permit the tapered portion of the male member to be received in the tapered opening 6, and the enlarged portion 5 disposed adjacent the nut C. The nut C is then turned in such a manner as to cause the threads upon the enlarged portion 5 to engage with the threads 18. During the movement of the nut C, the coarse threads cause the nut to move at a greater speed upon the portion 5 than upon the portion 14 as the threads upon the portion 14 are relatively fine. In this manner, the male member is forced within the female member until the tapered portion of the male member abuts the wall of the tapered opening 6 of the female member. At this position, the nut C becomes locked upon the portions 5 and 14. When the sections A and B are locked together by means of the nut C, they are in the position shown in Figure 2; that is, the nut C is positioned approximately an equal distance between the abutting flanges 3 and 12.

The section A is secured to the male member 20 of the nozzle D by means of the nut C in the same manner as the section A is secured to the section B.

The section B is secured to the faucet by means of the nut C in the same manner in which the section B is secured to the section A.

I claim:

A device of the type described comprising a hose connection having threads, an abutting flange integral with said hose connection, an annular locking flange integral with said hose connection and disposed between said threads and said abutting flange, a collar movably disposed concentric with said hose connection adjacent said abutting flange and provided with a tapered inner surface, and a hose adapted to be moved upon said hose connection toward said abutting flange during the rotation of said hose connection by the connection of said threads with the inner wall of said hose, the end of said hose being forced inwardly in close engagement with said arcuate-shaped threads by the tapered inner surface of said collar.

VICTOR KARBOWSKI.